United States Patent
Hirota et al.

(10) Patent No.: US 7,336,410 B2
(45) Date of Patent: Feb. 26, 2008

(54) HIGH-DEFINITION PIXEL STRUCTURE OF ELECTROCHROMIC DISPLAYS AND METHOD OF PRODUCING THE SAME

(75) Inventors: Shoichi Hirota, Hitachi (JP); Tetsuya Ohshima, Hitachi (JP); Tatsuya Sugita, Takahagi (JP)

(73) Assignee: Hitachi Displays, Ltd., Mobara-Shi (JP)

( * ) Notice: Subject to any disclaimer, the term of this patent is extended or adjusted under 35 U.S.C. 154(b) by 30 days.

(21) Appl. No.: 11/478,575

(22) Filed: Jul. 3, 2006

(65) Prior Publication Data

US 2007/0002424 A1  Jan. 4, 2007

(30) Foreign Application Priority Data

Jul. 4, 2005 (JP) ............................. 2005-195265

(51) Int. Cl.
*G02F 1/153* (2006.01)
*G09G 3/19* (2006.01)
*G09G 3/38* (2006.01)

(52) U.S. Cl. ..................... 359/271; 359/267; 359/268; 345/49; 345/105

(58) Field of Classification Search .................. 345/48, 345/49, 55, 105; 359/265, 267, 268, 269, 359/271, 274
See application file for complete search history.

(56) References Cited

U.S. PATENT DOCUMENTS

| | | | | |
|---|---|---|---|---|
| 6,885,489 B2 * | 4/2005 | Arai et al. | ................... | 359/265 |
| 6,992,808 B2 * | 1/2006 | Shinozaki et al. | .......... | 359/265 |
| 7,002,721 B2 * | 2/2006 | Arai et al. | ................... | 359/265 |
| 7,057,789 B2 * | 6/2006 | Shinozaki et al. | .......... | 359/265 |

FOREIGN PATENT DOCUMENTS

JP  2002-258327  9/2002

* cited by examiner

*Primary Examiner*—David N. Spector
(74) *Attorney, Agent, or Firm*—Antonelli, Terry, Stout & Kraus, LLP.

(57) ABSTRACT

A display of an electrochromic type, including an active matrix substrate on which a plurality of pixel electrodes corresponding to pixels are arranged in a matrix form; a counter substrate which is provided with a transparent electrode that is common with respect to a plurality of the pixel electrodes; and an electrochromic material which is sandwiched between the active matrix substrate and the counter substrate, and is colored in a boundary either between itself and the pixel electrode or between itself and the transparent electrode; wherein the pixel electrode other than an electrode-exposed part which contacts with the electrochromic material is covered with a transparent protective film; and the electrode-exposed part has a different area from the area of the part onto which a current generated between the transparent electrode and the pixel electrode concentrates, out of the transparent electrode.

7 Claims, 4 Drawing Sheets

HIGH-DEFINITION PIXEL STRUCTURE OF ELECTROCHROMIC DISPLAYS AND METHOD OF PRODUCING THE SAME

BACKGROUND OF THE INVENTION (1) Field of the Invention

The present invention relates to a display of a matrix type using an electrochromic material, and a method of producing the same.

(2) Description of Related Art

An electrochromic material means a coloring substance which precipitates, dissolves, discolors or colors caused by an electrochemical oxidation or reduction reaction, and a matrix type display using the material is disclosed (JP-A-2002-258327). The display has the coloring substance of the electrochromic material and an electrolyte provided between a transparent electrode on an observer side and a metallic electrode on a substrate side, in every pixel; produces a dark display by making the coloring substance at the transparent electrode into a coloring state; and produces a light display by making the coloring substance into a colorless state and consequently making white particles in the electrolyte reflect light (scattered light).

SUMMARY OF THE INVENTION

However, the display needs a sufficient thickness (several tens of micrometers) of a white layer (layer containing electrochromic material), in order to increase a reflectance which is a ratio of the quantity of incident light to the quantity of reflected light, because the display produces a light display by using the reflected light from white particles. As a result, the display has structural difficulty for a high-resolution display, due to a problem that when the display tries to produce such a high-resolution display as to give a pixel pitch equal distance to the thickness of the white layer, a pixel border becomes blurred, because an aspect ratio of the pixel pitch to the thickness is insufficient.

For this reason, an object of the present invention is to provide a display having the layer containing the electrochromic material thinned, and a method of producing the same.

A display of an electrochromic type according to the present invention for solving the above described problems has an active matrix substrate on which a plurality of pixel electrodes corresponding to pixels are arranged in a matrix form; a counter substrate which is provided with a transparent electrode that is common with respect to a plurality of the pixel electrodes, and faces to the active matrix substrate; and an electrochromic material which is sandwiched between the active matrix substrate and the counter substrate, and is colored in a boundary either between itself and the pixel electrode or between itself and the transparent electrode; wherein the pixel electrode other than an electrode-exposed part which contacts with the electrochromic material is covered with a transparent protective film; and the electrode-exposed part has a different area from the area of the part onto which a current generated between the transparent electrode and the pixel electrode concentrates, out of the transparent electrode.

An electric current passes through an electrochromic material between a transparent electrode that is common to a plurality of the pixel electrodes and the above described pixel electrode, but on the surface of the transparent electrode, the current concentrates particularly onto the part at which the pixel electrode is projected. Accordingly, when a certain direction of the current is selected, an electrochemical reaction occurs in a boundary between a part onto the current concentrates and an electrochromic material, to make the part corresponding to the pixel electrode into a colored region. In addition, even when the direction of the current is reversed, the current passes through the whole region of the pixel electrode. However, the pixel electrode other than the electrode-exposed part is covered with a transparent protective film, so that the electrochemical reaction occurs only in between the electrode-exposed part and the electrochromic material, to make the boundary between the electrode-exposed part and the electrochromic material into the colored region.

Here, a metal used as a pixel electrode has high intensity reflectance and reflects light incident on a display, so that the display can provide a necessary quantity of reflection light even when having the thickness of an electrochromic material thinned and scattered light reduced. On the other hand, when a boundary between the electrochromic material and a part in a transparent electrode, onto which a current from a pixel electrode is concentrated, is colored, the reflected light from the pixel electrode is shielded. Particularly, when employing a metal having high intensity reflectance for the pixel electrode, the display acquires a high reflectance which is a ratio of the quantity of the light incident on a display to the quantity of the reflected light.

The present invention can provide a display which has the thickness of a layer containing an electrochromic material reduced, and a method of producing the same.

Other objects, features and advantages of the invention will become apparent from the following description of the embodiments of the invention taken in conjunction with the accompanying drawings.

DETAILED DESCRIPTION OF THE INVENTION

First Embodiment

In the next place, a display according to the present embodiment will be described with reference to FIGS. 1A and 1B.

Figure 1A:
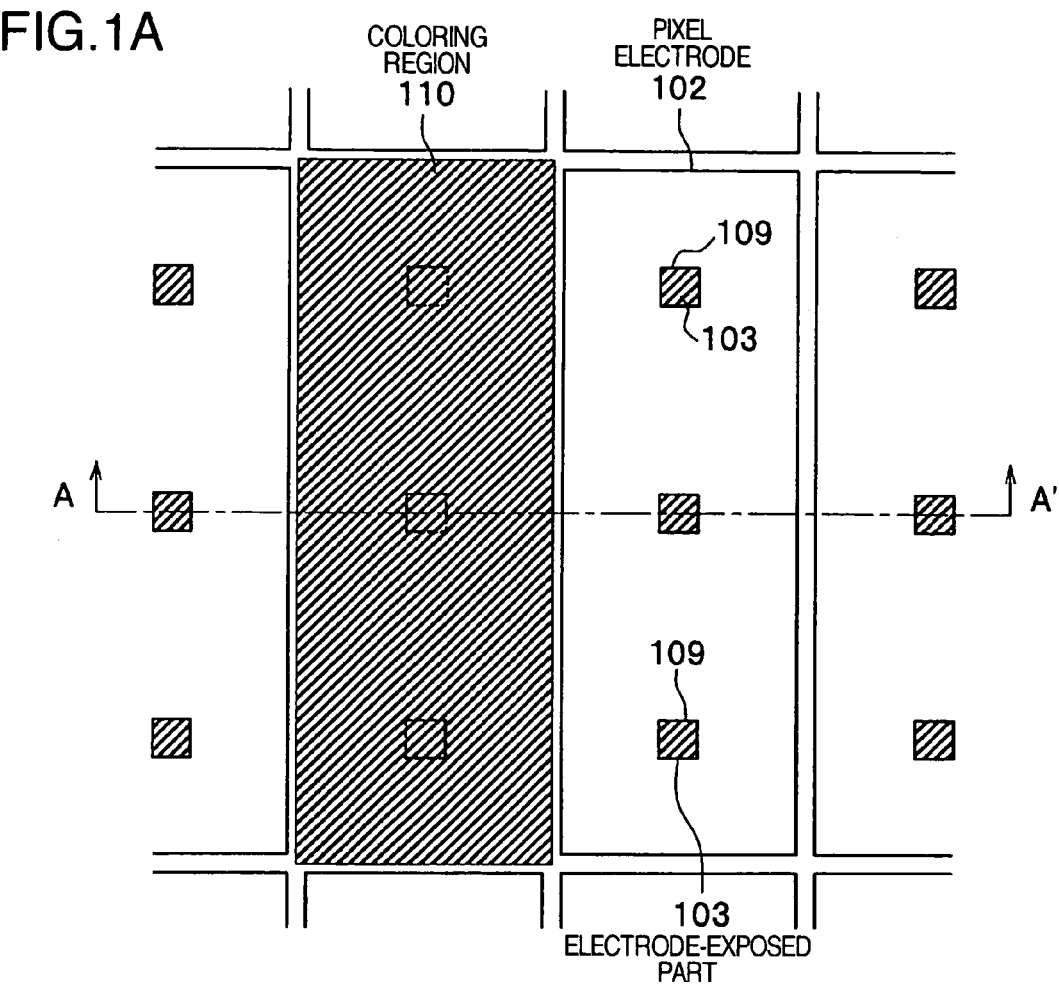
FIGS. 1A-1B are a plan view and a sectional view of a first embodiment.
Figure 1B:
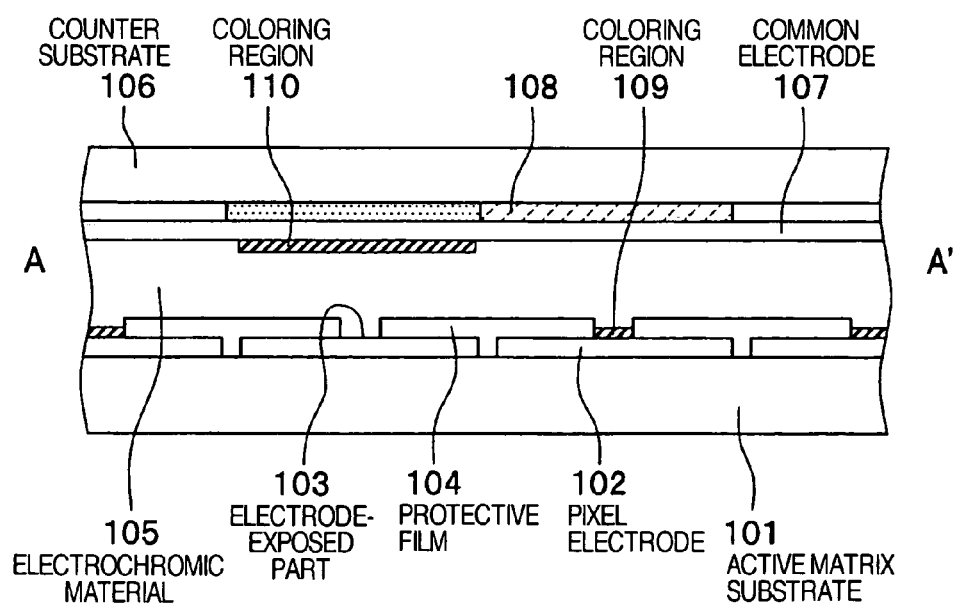

FIG. 1A shows a plan view of the display according to the present embodiment, and FIG. 1B shows a sectional view of A-A' in FIG. 1A. The display according to the present embodiment is mainly composed of: an active matrix substrate 101 having pixels formed in a matrix form in a row direction and a column direction; a transparent counter substrate 106 which faces to the active matrix substrate 101 of a back substrate in parallel; and an electrochromic material 105 which is sandwiched by the active matrix substrate 101 and the counter substrate 106. By the way, in the following discussion, "top and bottom" is an expression with reference to the drawings, so that top and bottom are reversed or shown in right and left, depending on a way of representation of the drawing.

On an active matrix substrate 101, a plurality of pixel electrodes 102 with a rectangular shape having a long side about 3 times longer than a short side are separately formed, so as to correspond to a pixel that is the minimum unit of a region in which a light display and a dark display are switched to each other. Here, the pixel electrode 102 is formed from a metallic material with high intensity reflectance, such as an aluminum metal or an alloy mainly containing aluminum, and functions as a reflecting mirror as well. In addition, the reflecting mirror has preferably an approximately uniform intensity reflectance in the whole wavelength of visible light. In addition, a transparent protective film 104 is formed on the surface of the pixel electrode 102 other than three square electrode-exposed parts 103 on the center line of the pixel electrode 102, so as to straddle the adjacent pixel electrodes 102. In other words, the pixel electrode 102 has a rectangular shape having a long side n times longer than a short side, and n pieces of electrode-exposed parts 103 are arranged on the central line of the rectangular shape.

On the other hand, a glass substrate such as a transparent quartz glass plate and a white board glass plate is used for a counter substrate 106. On the surface of the counter substrate 106, three types of color filters 108 for transmitting each wavelength of R, G and B is placed at parts facing to pixel electrodes 102; and a common electrode (transparent electrode) 107 which is common with respect to a plurality of the pixel electrodes 102 and is formed of a transparent electroconductive film such as ITO is further formed thereon. Here, a total length of the widths of the three color filters corresponds to the length of a long side of the pixel electrode 102. In FIG. 1B, a thin film transistor (TFT), a signal wire and a scanning wire are arranged in every pixel, but will be described later.

A usable electrochromic material 105 includes, for instance, a material such as metallic bismuth of which the ion is colored or becomes colorless by being electrochemically oxidized or reduced, in a boundary between itself and a pixel electrode 102 or between itself and a common electrode 107. In addition, reference numeral 109 and 110 will be described later.

Figure 2:
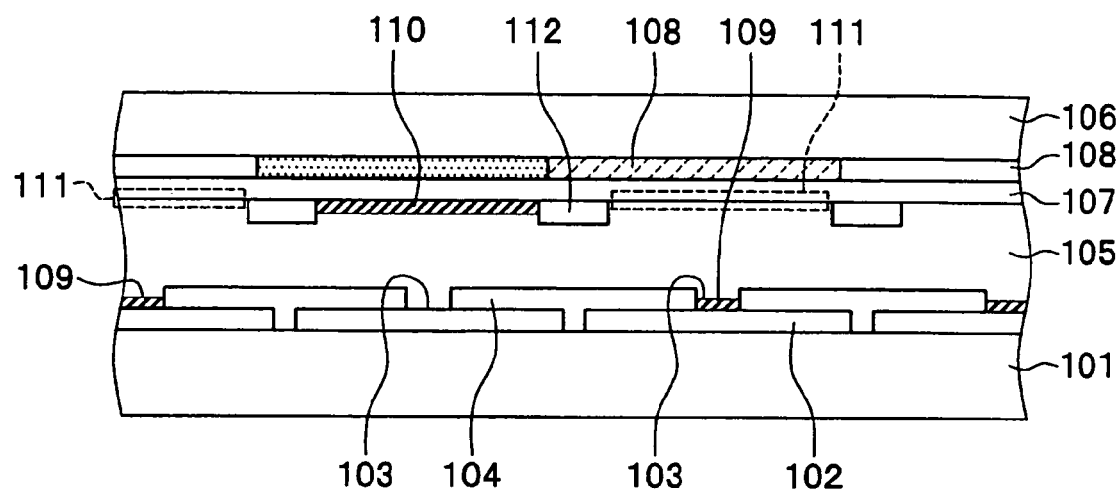
FIG. 2 is a view showing a modified example of a first embodiment.

In addition, FIG. 2 shows a modified configuration of FIG. 1. A protective film 112 is arranged at a boundary between pixels on an active matrix substrate 101 side of a common electrode 107, except an electrode-exposed part 111. The purpose of arranging the protective film 112 is to more definitely discriminate a boundary between pixels to be colored, by preparing the electrode-exposed part 111.

A display according to the present embodiment switches between a light display and a dark display, by switching a polarity of voltage applied between a pixel electrode 102 and a common electrode 107.

An electric current passes through an electrochromic material between a common electrode 107 of a transparent electrode and a pixel electrode 102, but on the surface of the common electrode 107, the current concentrates particularly onto a part at which the pixel electrode 102 is projected. Accordingly, an electrochemical reaction occurs in a boundary between a part onto which the current concentrates and an electrochromic material 105, to color the part corresponding to the pixel electrode 102. In addition, even when the polarity of the applied voltage is reversed, the current passes through the whole part of the pixel electrode 102. However, the pixel electrode 102 other than the electrode-exposed part 103 is covered with a transparent protective film 104, so that the electrochemical reaction occurs only in between the electrode-exposed part 103 and the electrochromic material 105, to color the boundary between the electrode-exposed part 103 and the electrochromic material 105. Specifically, the boundary between the part of the common electrode 107, onto which the current concentrates in correspondence with a size of the pixel electrode 102, and an electrochromic material 105 is a coloring region 110; and the boundary between the electrode-exposed part 103 and the electrochromic material 105 is a coloring region 109.

As is clear from FIGS. 1A-1B and FIG. 2, a coloring region 109 on an active matrix substrate 101 side has a greatly different area from that of the coloring region 110 on a counter substrate 106 side, and the coloring region 110 covers almost the whole area of a pixel whereas the coloring region 109 is limited to the electrode-exposed part 103. A state in which the boundary on a counter substrate 106 side is colored so as to cover almost the whole area of the pixel (in which the coloring region 110 is colored) is a dark display state when viewed from an observer side. On the other hand, a state in which the boundary on an active matrix substrate 101 side is colored so as to cover an electrode-exposed part 103 (in which the coloring region 109 is colored) is a light display state when viewed from an observer side.

The reason why the display is luminously visible in a light display state is because a coloring region 109 is limited to only an electrode-exposed part 103 which is a part of a pixel, so that in the other region, outside light is back-scattered by an electrochromic material 105 to produce a light display when viewed by an observer, and at the same time, the outside light forward-scattered by an electrochromic material 105 is reflected by a pixel electrode 102 covered with a protective film 104 and is visually identified by an observer. In addition, when the boundary on an active matrix substrate 101 side is colored, the whole pixel does not become a coloring region but only a part is colored, so that a pixel electrode 102 covered with a protective film 104 functions as a reflecting mirror and can efficiently reflect outside light, even though an electrochromic material 105 is thin and can not provide sufficient backward-scattering light.

As was described above, a display according to the present embodiment can sufficiently thin an electrochromic material 105 compared to a pixel pitch, hardly causes a problem that a border between pixels becomes blurred, even when having realized so-called such a high-resolution display as to decrease a pixel pitch which is a center spacing between adjacent pixel electrodes 102, and can realize an adequate high-resolution display. Specifically, the display can realize a high-resolution display which is an important property of electronic paper, because it can produce a light display even when the electrochromic material has smaller thickness than that of a pixel pitch.

Second Embodiment

The first embodiment employs a metal with a high intensity reflectance of light for a pixel electrode 102, and employs a protective film 104 for covering a part other than an electrode-exposed part 103; but it is possible to employ a metal with a low light intensity reflectance but high corrosion resistance (corrosiveness), form a contacting layer made from the metal on an active matrix substrate 101, layer a metal having a high intensity reflectance as a reflecting electrode on the contacting layer, and layer a protective film 104 on the surface of the reflecting electrode so as to protect it from corroding due to an electrochromic material 105. In the next place, the configuration will be described as a second embodiment. As for a part common to the first embodiment, the same reference numeral will be attached and the description will be omitted.

Figure 3:
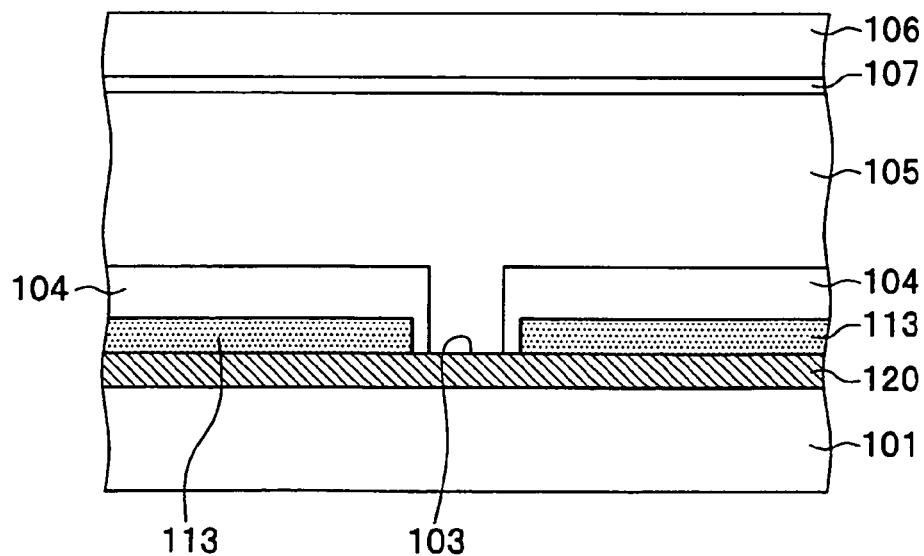
FIG. 3 is a sectional view of a second embodiment.

FIG. 3 shows a sectional view of a display in a second embodiment.

An electrode-exposed part 103 according to the present embodiment is formed by the steps of: layering a contacting layer 120 and a reflecting electrode layer 113 on an active matrix substrate 101, and removing one part of the reflecting electrode 113 through etching, to expose one part of the contacting layer 120 of the lower layer. Furthermore, the reflecting electrode 113 including the end face is covered with a protective layer 104, except an exposed part of the contacting layer 120 (electrode-exposed part 103). In other words, the display according to the second embodiment has a pixel-composing electrode formed of a multilayer consisting of at least two materials which are a material for composing a reflecting electrode 113 provided with a reflecting function and a material of a contacting layer 120 contacting with an electrochromic material 105, which is a different point from that in the first embodiment. It can be also said that the reflecting electrode 113 arranged between the contacting layer 120 corresponding to the pixel electrode and the protective film 104 is a metallic layer with high reflectance. Here, description on a configuration of the counter substrate 106 is omitted, because of being the same as in the first embodiment.

It is an advantage of the present embodiment to be able to employ separately different materials for a reflecting electrode 113 provided with a reflecting function, and for a contacting layer 120 which forms an electrode-exposed part 103 that contacts with an electrochromic material 105. In other words, it is the advantage to be able to select such a material for the contacting layer 120 as to hardly cause corrosion due to contact with the electrochromic material 105, without concern for the reflection properties of the material, because each material is charged with a separate function. A material with high corrosion resistance includes, for instance, a single metal such as tantalum, niobium, zirconium, titanium, molybdenum, chromium, tungsten and nickel, or an alloy thereof; or an oxide conductor represented by indium-tin oxide and indium-zinc oxide. On the other hand, a material for a reflecting electrode 113 can be selected from materials mainly having excellent reflection properties, without consideration of a problem of corrosion caused by contact with the electrochromic material 105, because the reflecting electrode is protected by a protective film 104 so as not to contact with the electrochromic material 105. A suitable candidate for the material of the reflecting electrode 113 includes such a metal or an alloy of aluminum, silver or the like as to have high reflectance for visible light.

Third Embodiment

In the first embodiment, one part of a pixel electrode 102 is forced to contact with an electrochromic material 105 as an electrode-exposed part 103, but it is possible to avoid the pixel electrode from directly contacting with the electrochromic medium, by using electroless plating. In the next place, the above configuration will be described as a third embodiment. In the third embodiment, a part common to the first embodiment will be marked with the same reference numeral, and the description will be omitted.

Figure 4:
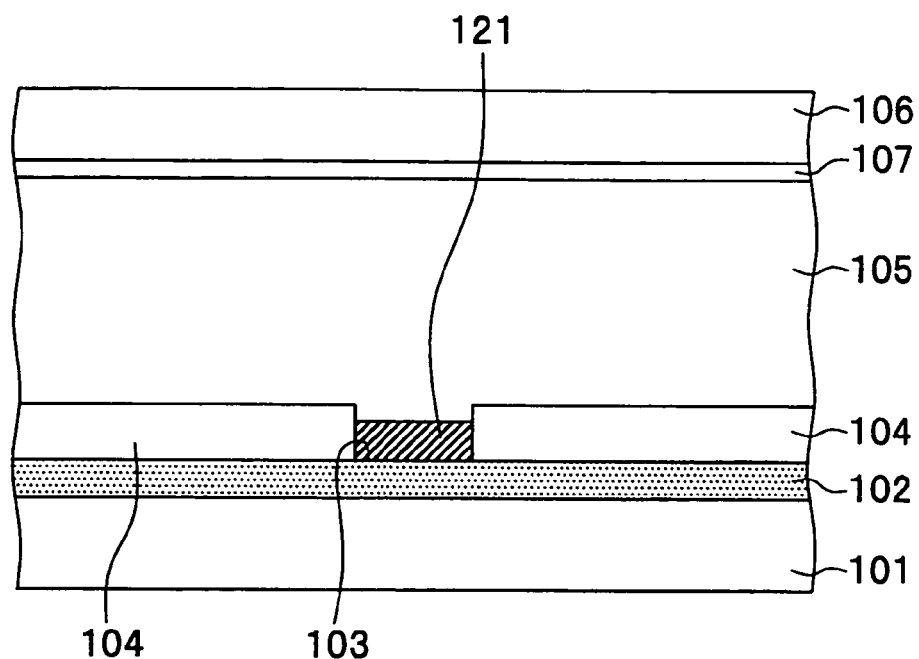
FIG. 4 is a sectional view of a third embodiment.

FIG. 4 shows a sectional view of a display of the third embodiment. A contacting layer 121 is deposited at an electrode-exposed part 103 on an active matrix substrate 101 with an electroless plating process. In addition, a protective film 104 is formed on the other part than the electrode-exposed part 103. It is recommended to select a material which forms the contacting layer 121 from materials which hardly cause a problem of corrosion caused by an electrochromic material 105, and specifically the material preferably includes copper, nickel and chromium. The electroless plating step can reduce one step in a photolithography process which needs a high cost. In the above configuration, a side of a counter substrate 106 has the same configuration as in the first embodiment, so that the description is omitted.

The display is produced by the steps of: forming a pixel electrode 102 of a metallic layer with high reflectance for reflecting light, on an active matrix substrate 101; covering a pixel electrode 102 (metallic layer with high reflectance) except an electrode-exposed part 103, with a transparent protective film 104; forming a contacting layer 121 which contacts with an electrochromic material 105, on an electrode-exposed part 103, with the use of an electroless plating method; and providing the electrochromic material 105 between a counter substrate provided with a transparent common electrode 107 which is common with respect to a plurality of the pixel electrodes 102 and the active matrix substrate 101. The electrode-exposed part 103 has a different area from that of a part of the common electrode 107, onto which a current generated between the common electrode 107 and the pixel electrode 102 is concentrated, which is the same as in the above described respective embodiments.

Fourth Embodiment

In the above described respective embodiments, an electrode-exposed part 103 is electrically connected to a pixel electrode 102 or a reflecting electrode 113, but those can be electrically insulated. In the next place, the above configuration will be described as a fourth embodiment.

Figure 5:
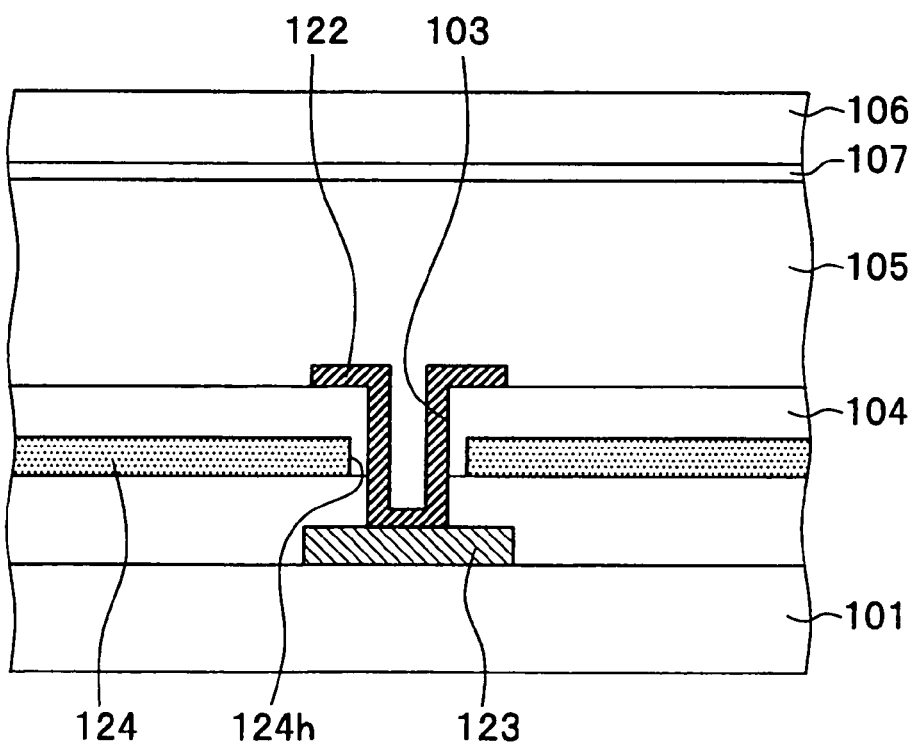
FIG. 5 is a sectional view of a fourth embodiment.

FIG. 5 shows a sectional view of a display of the fourth embodiment. The fourth embodiment adopts a configuration of connecting a lower wiring layer 123 with the pixel electrode 122 through a through-hole part 124h of a reflective layer 124. Specifically, in the configuration, the reflective layer 124 having a reflecting function is electrically separated from the pixel electrode 122 provided with the electrode-exposed part 103.

It is acceptable to select a material for a pixel electrode 122 from materials which hardly cause a problem of corrosion caused by an electrochromic material 105, without concern for the reflection properties. In addition, a material for a reflective layer 124 can be selected from materials mainly having excellent reflection properties, without consideration of a problem of corrosion caused by contact with an electrochromic material 105, because the reflective layer is separated from the electrochromic material 105 by a protective film 104.

(Drive Circuit)

Figure 6:
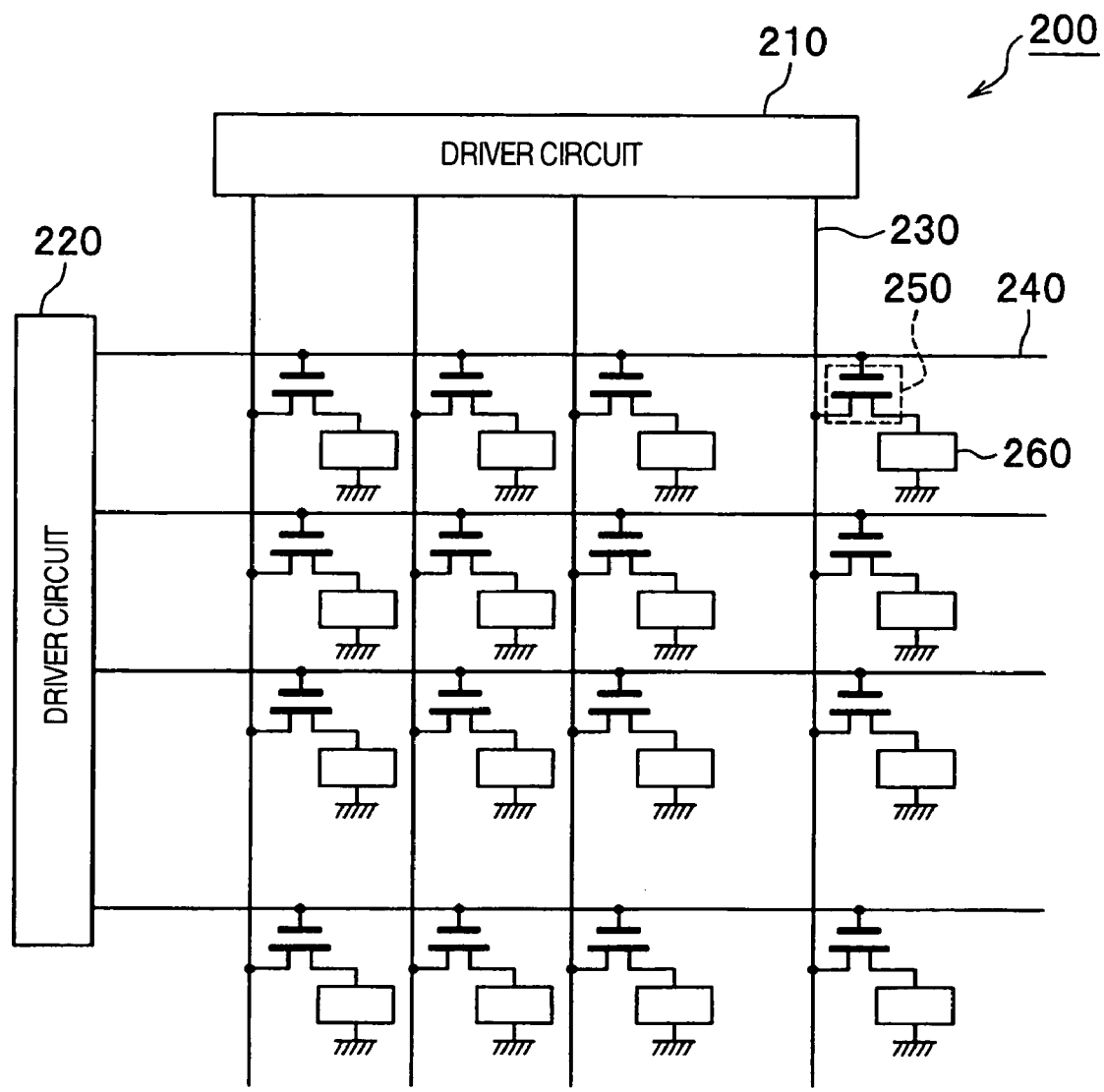
FIG. 6 is a block diagram of a drive circuit for driving a display.

FIG. 6 shows a block diagram of a drive circuit 200 for driving a display of the above described respective embodiments.

The drive circuit is composed of a plurality of thin film transistors 250 having the gate ends made common by a gate wire 240 and the drain ends made common by a drain wire 230, which are combined into a matrix form. The source end of each thin film transistor 250 is grounded through a pixel cell 260 formed of a pixel electrode 102 and a common electrode 107 (see FIG. 1 and others). Then, a driver circuit 210 drives a plurality of drain wires 230, and a driver circuit 220 drives a plurality of gate wires 240. Thereby, the thin-film transistor 250 controls the pixel cell 260 to display an image. The drive circuit is also configured so that the driver circuit 220 can change a polarity of output voltage to change the polarity of voltage to be applied to each pixel.

MODIFIED EXAMPLE

The present invention is not limited to the above described embodiments but can be variously modified as will be described below.

(1) The display in the above described respective embodiments only produces a light display and a dark display and does not produce a gradation display, but it is possible to make a display produce a half-tone display through area gradation. The half-tone display can be realized, for instance, by dividing a pixel electrode 102 in a row or column direction. In this case, it is acceptable to divide the pixel electrode 102 not only by equal width but also by different widths. For instance, when a reflecting surface is quartered, a reducible quantity of light in the whole pixel can be gradated into five levels of 0, ¼, ½, ¾ and 1, because the reducible quantity of light of each reflecting surface is all ¼. Furthermore, when the reflecting surface is divided into four by division widths of 1:2:4 (the second power of 2):8 (the third power of 2), the reducible quantities of light of the four reflecting surfaces become ¹⁄₁₅, ²⁄₁₅, ⁴⁄₁₅ and ⁸⁄₁₅, and the reducible quantity of light of the whole pixel can be gradated into 16 levels of 0, ¹⁄₁₅ to ¹⁴⁄₁₅ and 1, which is preferable. As has been described above, it is possible to produce a gradation display of 2 to the N-th power by dividing the reflecting surface into N pieces by inequable spacing widths.

(2) The display in the above described respective embodiments employs a transparent glass substrate for a counter substrate 106, but the material for the counter substrate is not limited to the transparent glass substrate, but includes, for instance, an ester such as polyethylenenaphthalate and polyethylene terephthalate; a polyamide; polycarbonate; a cellulose ester such as cellulose acetate; a fluorine polymer such as polyvinylidene fluoride and polytetrafluoroethylene-hexafluoropropylene copolymer; a polyeter such as polyoxymethylene; a polyolefin such as polyacetal, polystyrene, polyethylene, polypropylene and methylpenten polymer; and a polyimide such as polyimide-amide and polyetherimide. When these synthetic resins are employed for a support, they can be used either in a rigid substrate form that is not easily bent, or in a film form having flexibility.

(3) In the above described respective embodiments, ITO is employed in a transparent electroconductive film, but the material is not limited thereto, and can employ a mixture of $In_2O_3$ and $SnO_2$, which is so-called an ITO film, or a film of coated $SnO_2$ or coated $In_2O_3$. It is further possible to employ the ITO film or the film of coated $SnO_2$ or $In_2O_3$, which is doped with Sn and Sb, and to employ MgO or ZnO as well.

(4) When a pixel has a large size or an unrectangular shape, an electrode-exposed part 103 need not necessarily be placed on a central line of the pixel. When the pixel has a larger size than a region affected by one electrode-exposed part 103, a sufficient number of regions for switching the whole pixel need to be placed, when considering the region affected by the electrode-exposed part 103 as a unit. When a length of a short side of a pixel is longer than a width of the above described unit region, it is insufficient for only the unit region placed on a central line of the pixel to switch the whole pixel. In this case, it is preferable to arrange the electrode-exposed parts 103 into, for instance, a matrix form, a close-packed form and a honeycomb form, though it depends on a shape of the pixel.

The present invention provides a technology for realizing electronic paper which is a display capable of showing an appearance like paper, and is important for composing a display for reading a document converted to an electronic format.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display of an electrochromic type, comprising
an active matrix substrate on which a plurality of pixel electrodes corresponding to pixels are arranged in a matrix form;
a counter substrate which is provided with a transparent electrode that is common with respect to a plurality of the pixel electrodes, and faces to the active matrix substrate; and
an electrochromic material which is sandwiched between the active matrix substrate and the counter substrate, and is colored in a boundary either between itself and the pixel electrode or between itself and the transparent electrode; wherein
the pixel electrode other than an electrode-exposed part which contacts with the electrochromic material is covered with a transparent protective film; and
the electrode-exposed part has a different area from the area of the part onto which a current generated between the transparent electrode and the pixel electrode concentrates, out of the transparent electrode.

2. A display of an electrochromic type, comprising
an active matrix substrate on which a plurality of pixel electrodes corresponding to pixels are arranged in a matrix form;
a counter substrate which is provided with a transparent electrode that is common with respect to a plurality of the pixel electrodes, and faces to the active matrix substrate; and
an electrochromic material which is sandwiched between the active matrix substrate and the counter substrate, and is colored in a boundary either between itself and the pixel electrode or between itself and the transparent electrode; wherein
the pixel electrode other than an electrode-exposed part contacting with the electrochromic material is covered with a transparent protective film; and
the electrode-exposed part has a different area from the area of the part of the transparent electrode, at which the pixel electrode is projected.

3. The display according to claim 1, wherein a metal having a low light-intensity reflectance but high corrosion resistance is used in the electrode-exposed part of the pixel electrode, and a metal having low corrosion resistance but a high light-intensity reflectance is used in the other part of the pixel electrode, and the other part is covered with the protective film.

4. The display according to claim 1, wherein a metallic layer with high reflectance is provided between the protective film and the pixel electrode.

5. The display according to claim 4, wherein the pixel electrode is electrically insulated from the metallic layer with high reflectance.

6. The display according to claim 1, wherein the pixel electrode has such a rectangular shape as to have a long side n times longer than a short side, when n is a natural number, and n spots of electrode-exposed parts are arranged on a central line of the rectangular shape.

7. A method of producing a display comprising the steps of:

forming a metallic layer with high reflectance for reflecting light, on an active matrix substrate having a plurality of pixel electrodes corresponding to pixels arranged in a matrix form, so as to correspond to the pixel electrode;

covering the metallic layer with high reflectance with a transparent protective film, except an electrode-exposed part;

providing an electrochromic material between a counter substrate provided with a transparent electrode which is common with respect to a plurality of the pixel electrodes, and the active matrix substrate;

adjusting the area of the electrode-exposed part so as to be different from the area of a part onto which a current generated between the transparent electrode and the pixel electrode concentrates; and forming a contacting layer which contacts with the electrochromic material, with an electroless plating method in the electrode-exposed part.

* * * * *